UNITED STATES PATENT OFFICE.

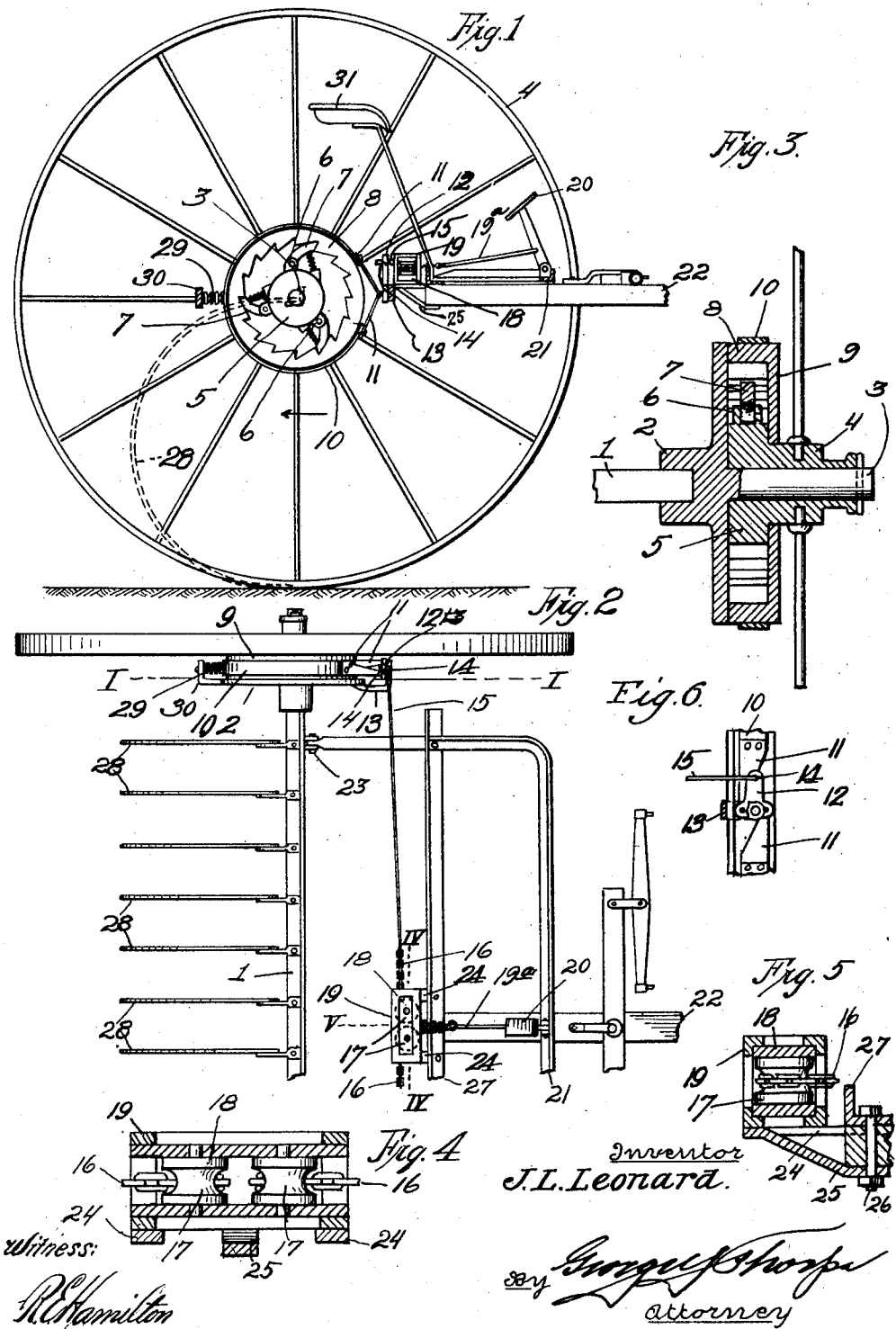

JAMES L. LEONARD, OF PLEASANT HILL, MISSOURI.

SELF-DUMPING HAY-RAKE.

1,384,264.  Specification of Letters Patent.  Patented July 12, 1921.

Application filed April 14, 1920. Serial No. 373,770.

*To all whom it may concern:*

Be it known that I, JAMES L. LEONARD, a citizen of the United States, and resident of Pleasant Hill, in the county of Cass, State of Missouri, have invented a certain new and useful Improvement in Self-Dumping Hay-Rakes, of which the following is a complete specification.

This invention relates to self-dumping hay rakes, and my object is to produce a machine of this character which will operate efficiently when traveling in a direct line or when turning, and which furthermore is of simple, strong, durable and comparatively inexpensive construction, having few parts capable of getting out of order, and susceptible as an attachment, to standard or approved type of hay rakes now in use.

With this general object in view the invention consists in certain novel and useful features of construction and combinations of parts as hereinafter described and claimed; and in order that it may be fully understood reference is to be had to the accompanying drawing, in which:—

Figure 1 is a vertical section of a hay rake embodying the invention, the section being taken on the line I—I of Fig. 2.

Fig. 2 is a fragmental plan view of the rake.

Fig. 3 is an enlarged central vertical section of one of the carrying wheels and the adjacent portion of the rake frame and mechanism.

Fig. 4 is an enlarged section taken on the line IV—IV of Fig. 2.

Fig. 5 is a vertical section on the same scale as Fig. 4, on the line V of Fig. 2.

Fig. 6 is an enlarged section to show more clearly the means for applying the brake bands for effecting the automatic dumping operation.

In the said drawing 1 indicates the axle of the rake, the same being preferably of angle iron as indicated most clearly by Fig. 2, and secured rigidly on the ends of said angle iron axle are disks 2 provided with spindles 3 alined with and forming in effect extensions of the axle.

Journaled on the spindles 3 and retained thereon and against the outer faces of the disks 2, are carrying wheels 4, the hubs thereof terminating at their inner ends in enlargements 5 provided peripherally with series of equi-distant lugs 6 between which are pivoted spring actuated pawls or dogs 7, yieldingly engaging the internal ratchet teeth 8 of disk 9 journaled on the hubs of the wheel.

10 are brake bands of the type common in automobile construction fitting around the disks 9 and pivotally connected by links 11 to the opposite ends of the heads of inverted T-shaped levers 12, each lever 12 being fulcrumed centrally between the points of connection therewith of the links 11, on an angle arm 13 formed integral with or otherwise rigidly secured to the adjacent disk 2.

Pivoted at 14 to the stem of each lever 12, is an inwardly extending link 15, and said links are connected to chains or flexible connections 16, extending around and forwardly from a pair of grooved sheaves 17 journaled in a frame 18 slidable transversely of the machine in a guide frame 19, the front ends of said chains being connected to a rod 19ª pivotally connected to a foot lever 20 fulcrumed on the transverse frame 21 of the machine, which frame as customary, rests upon the tongue 22. The frame 21 is of U-shape and is pivoted at its ends as at 23 to the axle 1, so that the tongue may rise and fall without turning the axle, which, therefore, may be turned about a quarter revolution before it is arrested by contact with the ends of frame 21.

As a convenient method of supporting the frame 19, bars 24 extend forwardly from the under side of said frame to the cross brace 27 connecting the tongue with the side portions of frame 21, as customary, and an inclined brace 25 also connects frame 19 with the under side of the tongue at the rear end thereof as shown. The axle is provided with the customary semi-circular rake teeth 28, and the brake bands 10 are normally held relaxed with respect to the disks 9, by suitable springs, the same being illustrated conventionally at 29, the springs being connected to the brake bands at their front ends and to extensions 30 of the disks 2. It will be understood of course that any approved type of means for holding the brakes normally relaxed, as common in motor car construction may be employed for that shown herein.

In the ordinary progress across a field, the wheels 4 rotate, and in turning cause the disks 9 to turn because of the engagement with the teeth of said disks of the pawls or dogs 7, the rotation of said parts occurring without affecting the position of the axle. When a sufficient accumulation of hay has been made, the operator upon the seat 31 applies forward pressure on the foot lever 20, to rock the T-shaped levers 12 inwardly and hence effect the application of the brake bands to the peripheries of the disks 9, it being apparent that this application of pressure of both brake bands is uniform because the frame 18 will equalize any inequality in the length of the connections and slide toward one side or the other in so doing. As the brake bands are caused to grip said disks, the latter turn in a forward and downward direction because of the fact that the brake bands are linked to the levers 12 which in turn are carried by the disks 2. The disks 2 therefore are turned in a similar direction and consequently turn the axle and raise the rake teeth from the ground until the dumped action is complete; the pressure on the foot lever being maintained until the raised teeth have passed over the dumped material. When this occurs the teeth are permitted to drop by removing the pressure from the foot lever. In the event the dumping operation must take place while the machine is turning, and one wheel is therefore turning more rapidly than the other, the wheel which is turning most rapidly will effect the dumping function as hereinbefore explained. Should it be necessary to back the machine, the pawls or dogs will slip inoperatively over the teeth 8 of the disks 9, and should the machine be turned on one of the wheels 4 as a pivot, said wheel may be stationary while the other rotates. It will thus be seen that the machine adapts itself to all conditions of operation, and while I have illustrated and described the preferred construction of the invention, it will be apparent that it is susceptible of modification in minor particulars without departing from the principle of construction or mode of operation involved and it is to be understood that I reserve the right to all changes falling within the scope of the appended claims.

I claim:

1. A self-dumping hay rake, comprising an axle provided with rake teeth, parts rigid with the axle and provided with spindles alined with the axle, wheels journaled on said spindles, disks rotatable around the axis of the axle adjacent the said parts, pawl and ratchet mechanisms for transferring power from said wheels to said disks when the wheels are turning forwardly, and means for securing the said disks in rigid relation to the said parts, to effect turning movement of the axle to lift the rake teeth from the ground.

2. A self-dumping hay rake, comprising an axle provided with rake teeth, parts rigid with the axle and provided with spindles alined with the axle, wheels journaled on said spindles, disks rotatable around the axis of the axle adjacent the said parts, pawl and ratchet mechanisms for transferring power from said wheels to said disks when the wheels are turning forwardly, means for securing the said disks in rigid relation to the said parts, to effect turning movement of the axle to lift the rake teeth from the ground, and manually-operable means for actuating the means for securing said disks in rigid relation to the said parts.

3. A self-dumping hay rake, comprising an axle provided with rake teeth, parts rigid with the axle and provided with spindles alined with the axle, wheels journaled on said spindles, disks rotatable around the axis of the axle adjacent the said parts, pawl and ratchet mechanisms for transferring power from said wheels to said disks when the wheels are turning forwardly, means for securing the said disks in rigid relation to the said parts, manually-operable means for actuating the means for securing the said disks in rigid relation to the said parts, and means for equalizing the force applied by the manually-operable means on the means for securing said disks in rigid relation to the said parts.

4. A self-dumping hay rake, comprising an axle provided with rake teeth, parts rigid with the axle and provided with spindles alined with the axle, wheels journaled on said spindles, disks rotatable around the axis of the axle adjacent the said parts and provided with internal beveled teeth, spring actuated pawls rotatable with the said wheels and engaging said beveled teeth, and adapted to turn said disks when the said wheels are turning forwardly, and clamping means for securing the said disks in rigid relation with the said parts.

5. A self-dumping hay rake, comprising an axle provided with rake teeth, parts rigid with the axle and provided with spindles alined with the axle, wheels journaled on said spindles, disks rotatable around the axis of the axle adjacent the said parts, and provided with internal teeth, spring actuated pawls rotatable with the said wheels and engaging the said beveled teeth, for turning the said disks when the wheels are turning forwardly, means for clamping the said disks in rigid relation with the said parts, and manually-operable means for actuating the said means for securing said disks to said parts.

6. A self-dumping hay rake, comprising an axle provided with rake teeth, parts rigid with the axle and provided with spindles alined with the axle, wheels journaled on said spindles, disks journaled on the spindles of the axle and provided with internal beveled teeth, spring actuated pawls rotatable with the said wheels and engaging the said beveled teeth, levers fulcrumed upon the said parts, brake bands around the said disks and linked to said levers, and manually-operable means for operating said levers to clamp said brake bands simultaneously upon the said disks.

7. A self-dumping hay rake, comprising an axle provided with rake teeth, parts rigid with the axle and provided with spindles alined with the axle, wheels journaled on said spindles, disks journaled on the spindles of the axle and provided with internal beveled teeth, spring actuated pawls rotatable with the said wheels and engaging the said beveled teeth, levers fulcrumed upon the said parts, brake bands around the said disks and linked to said levers, manually-operable means for operating said levers to clamp said brake bands simultaneously upon the said disks, and a transversely slidable equalizer for equalizing the pressure applied by said brakes upon said disks.

In witness whereof I hereto affix my signature.

JAMES L. LEONARD.